United States Patent US 11,511,709 B2
Hung  Nov. 29, 2022

(54) SUPPORT DEVICE WITH DIFFERENTIAL MECHANISM TRANSMISSION

(71) Applicant: MOTECK ELECTRIC CORP., New Taipei (TW)

(72) Inventor: Chih-Li Hung, New Taipei (TW)

(73) Assignee: MOTECK ELECTRIC CORP., New Taipei (TW)

( * ) Notice: Subject to any disclaimer, the term of this patent is extended or adjusted under 35 U.S.C. 154(b) by 0 days.

(21) Appl. No.: 17/358,600

(22) Filed: Jun. 25, 2021

(65) Prior Publication Data

US 2022/0032881 A1    Feb. 3, 2022

(30) Foreign Application Priority Data

Jul. 29, 2020  (TW) .................................. 109209734

(51) Int. Cl.
*B60S 9/06* (2006.01)
*F16H 25/20* (2006.01)

(52) U.S. Cl.
CPC ................ *B60S 9/06* (2013.01); *F16H 25/20* (2013.01); *F16H 2025/2081* (2013.01); *F16H 2025/2087* (2013.01)

(58) Field of Classification Search
CPC ..... F16H 2025/2087; F16H 2025/2081; F16H 25/20; B60S 9/06
See application file for complete search history.

(56) References Cited

U.S. PATENT DOCUMENTS

| 6,237,953 | B1* | 5/2001 | Farmer | B60S 9/06 |
| | | | | 254/423 |
| 2018/0215287 | A1* | 8/2018 | Koop | B60N 2/0232 |
| 2019/0106925 | A1* | 4/2019 | McCorkell | F16H 25/24 |
| 2020/0052550 | A1* | 2/2020 | Shimizu | F16H 25/20 |
| 2020/0056686 | A1* | 2/2020 | Veilleux, Jr. | F16H 25/2204 |
| 2020/0340562 | A1* | 10/2020 | Eriksen | F16K 31/508 |
| 2021/0370888 | A1* | 12/2021 | Peacemaker | B66F 3/10 |

FOREIGN PATENT DOCUMENTS

CN           208804189 U  *  4/2019  ............. F16H 25/20

* cited by examiner

*Primary Examiner* — David M Fenstermacher
(74) *Attorney, Agent, or Firm* — Muncy, Geissler, Olds & Lowe, P.C.

(57) ABSTRACT

A support device with differential mechanism transmission includes a base, a transmission device and a support mechanism. When the ring gear of the differential mechanism of the transmission device drives the first planetary gear assembly of the transmission device to rotate, the first planetary gear assembly cooperates with the central gear and the second planetary gear assembly of the transmission device to determine the sequence of unilateral transmission of the first lead screw and the second lead screw of the transmission device to drive the supporting legs of the support mechanism to expand outward or retract inward. In turn, it achieves the purpose of stable support, and has the effects of simple structure, miniaturization and cost reduction.

8 Claims, 8 Drawing Sheets

SUPPORT DEVICE WITH DIFFERENTIAL MECHANISM TRANSMISSION

This application claims the priority benefit of Taiwan patent application number 109209734, filed on Jul. 29, 2020.

BACKGROUND OF THE INVENTION

1. Field of the Invention

The present invention relates to a support device with differential mechanism transmission, especially the transmission device installed in the middle of the base is so designed that, according to the resistance of the two planetary gear assemblies, the order of the unilateral transmission of the lead screws on the two sides can be determined to respectively drive the two supporting legs spread out to stop against the uneven ground, thereby improving the stability of the support.

2. Description of the Related Art

With the improvement of the quality of life of modern people, many people are in busy daily life, work and other kinds of tension and pressure. How to achieve physical and mental relaxation, and moderate stress relief, has always been one of the lifestyles pursued by modern people. There are also more diversified options for holiday arrangements. In addition to playgrounds, tourist attractions, restaurants or homestays, etc., in recent years, there have also been more and more people advocating the environment of nature, choosing to camp outdoors and experiencing a different lifestyle from the daily life to achieve leisure and relaxation.

As the camping trend is becoming more and more popular, in order to solve the food and lodging needs of being outdoors, most camping vehicles are equipped with kitchen, living room, bedroom and other living spaces, and the body of the vehicle is fully equipped, so it is very suitable for frequent travel in the mountains and water. Small families who love camping in the wild, in order to stabilize the vehicle when the camper is parked, generally use jacks to rise to support the bottom of the vehicle to prevent the camper from swaying or shaking when the occupants move in the vehicle. When using traditional jacks, the owner needs to walk around to manually operate multiple jacks to stabilize the vehicle on the ground. This manual operation is difficult and time-consuming, especially at night or under adverse weather conditions. Therefore, some companies have introduced electric jacks and installed the electric jacks on the bottom of the rear of the vehicle. The motor can drive the two-way lead screw for bilateral transmission, so that two supporting legs can be lowered and stopped against the ground to stabilize the vehicle. However, the two-way lead screw uses two-way threads for bilateral transmission, which not only has manufacturing difficulties and higher costs, but also the motor is installed at the end of the lead screw, and its stroke will also occupy a larger volume. It needs to be redesigned by those engaged in this industry to solve the problems.

SUMMARY OF THE INVENTION

The present invention has been accomplished under the circumstances in view. It is one object of the present invention to provide a support device with differential mechanism transmission, which comprises a base, a transmission device, and a support mechanism. The transmission device comprises a seat body installed in the middle of the base, a differential mechanism mounted in the seat body, a drive unit mounted outside the seat body, a first lead screw and a second lead screw. The differential mechanism comprises a ring gear, a first planetary gear assembly, a central gear and a second planetary gear assembly drivable by the drive unit. The first lead screw and the second lead screw having the same thread direction. The first planetary gear assembly and the second planetary gear assembly are coaxially connected with the first lead screw and the second lead screw on both sides. The first lead screw has a first actuating member threaded thereon. The first actuating member is linearly movable along the first lead screw. The second lead screw has a second actuating member threaded thereon. The second actuating member is linearly movable along the second lead screw. The support mechanism comprises two supporting legs respectively pivotally connected to the first actuating member and the second actuating member. When the ring gear of the differential mechanism drives the first planetary gear assembly to rotate, the first planetary gear assembly cooperates with the central gear and the second planetary gear assembly to determine the sequence of unilateral transmission of the first lead screw and the second lead screw to drive the supporting legs of the support mechanism to expand outward to support the uneven ground, thereby achieving the purpose of stable support when the vehicle is parked.

It is another object of the present invention to provide a support device with differential mechanism transmission, wherein the first planetary gear assembly can cooperate with the central gear and the second planetary gear assembly to determine the sequence of unilateral transmission of the first lead screw and the second lead screw to drive the supporting legs of the support mechanism to expand outward or retract inward, and the supporting legs can be adjusted and compensated to support the uneven ground, so as to achieve the purpose of stable support when the vehicle is parked. Because the first lead screw and the second lead screw have the same thread direction, it can avoid the problems of manufacturing difficulties and high costs caused by the double-sided transmission of the positive and negative two-way threads of a single lead screw, and has a simple structure, small size and the effect of cost reduction.

It is still another object of the present invention to provide a support device with differential mechanism transmission, wherein when the drive unit of the transmission device drives the ring gear of the differential mechanism to rotate, only one lead screw can drive at the same time. If the second lead screw receives a large resistance and cannot rotate, it will also prevent the central gear engaged by the second planetary gear assembly from rotating. Therefore, the first planetary gear assembly will spin and rotate along the central gear, so that the first lead screw can drive one of the supporting legs of the support mechanism to drop to support the ground and then stop rotating. At this time, the first planetary gear assembly can only rotate, driving the central gear in the reverse direction to make the second planetary gear assembly rotate and rotate along the fixed second internal gear, so that the second lead screw can drive the other supporting leg of the support mechanism to descend and to stop against the ground. Until the load current of the motor of the drive unit is greater than the rated current, the current limit protection method can be used to stop the motor when the motor is subjected to the overload current.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
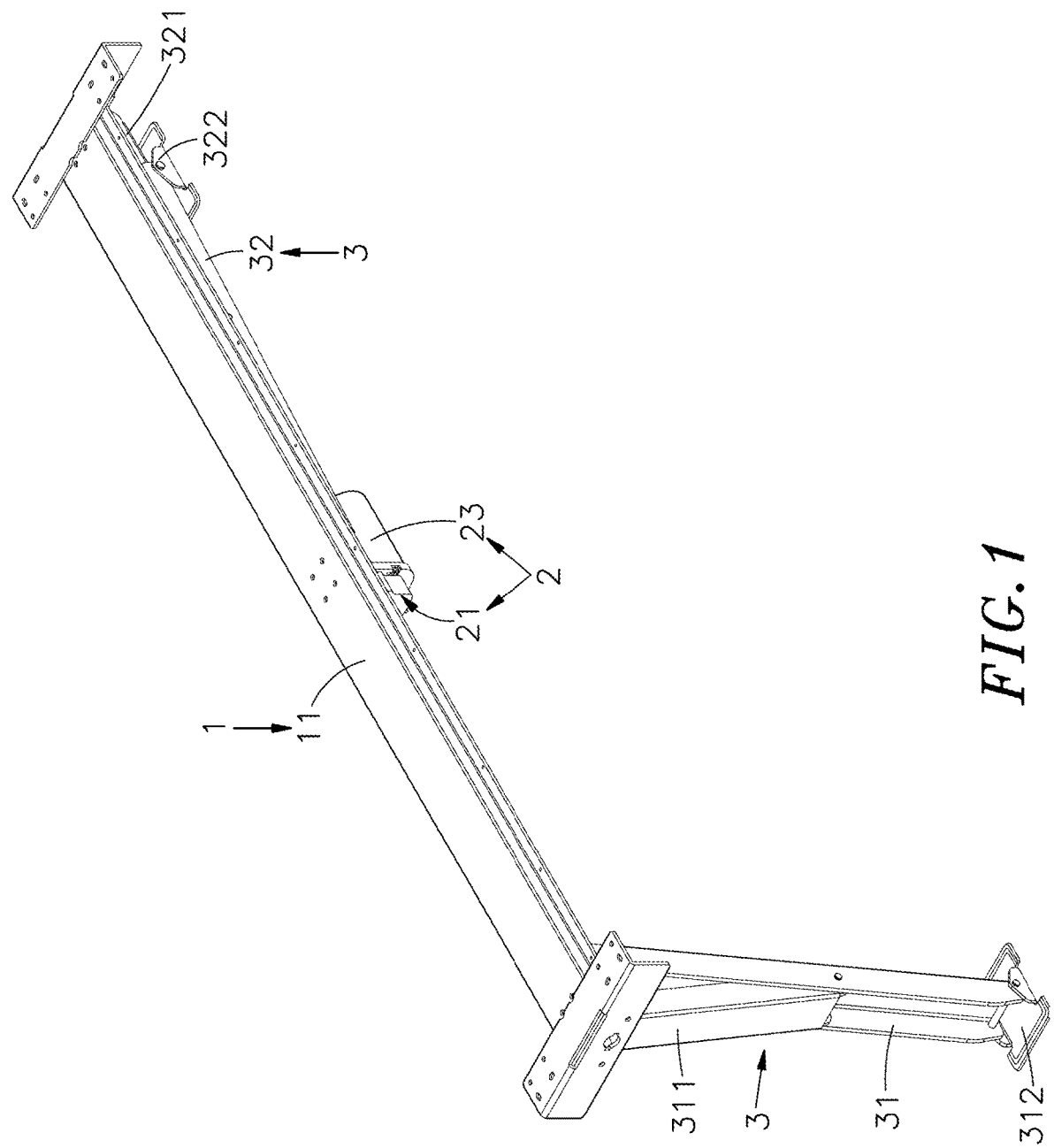
FIG. 1 is an oblique top elevational view of a preferred embodiment of the present invention.
Figure 2:
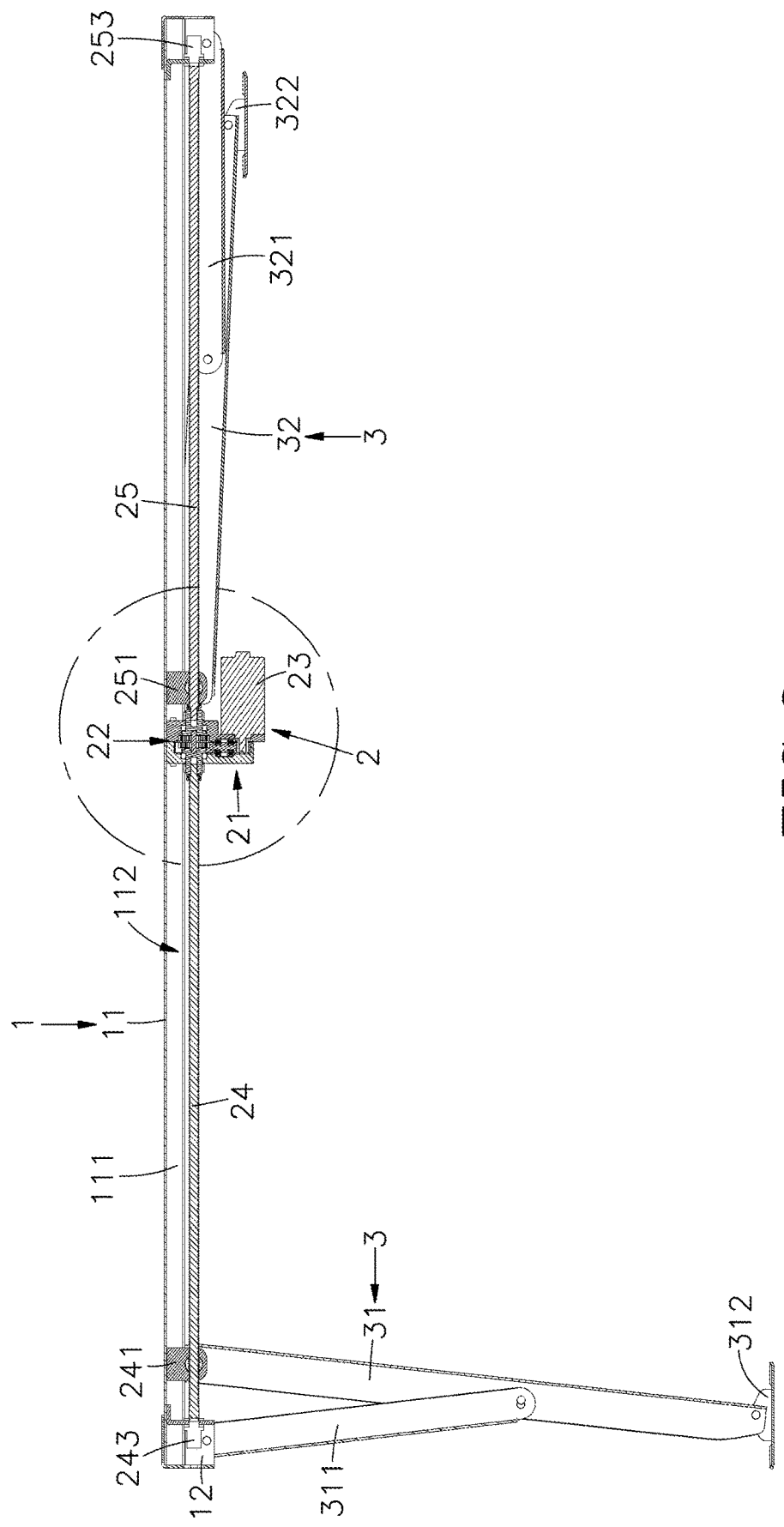
FIG. 2 is a sectional side view of the preferred embodiment of the present invention.
Figure 3:
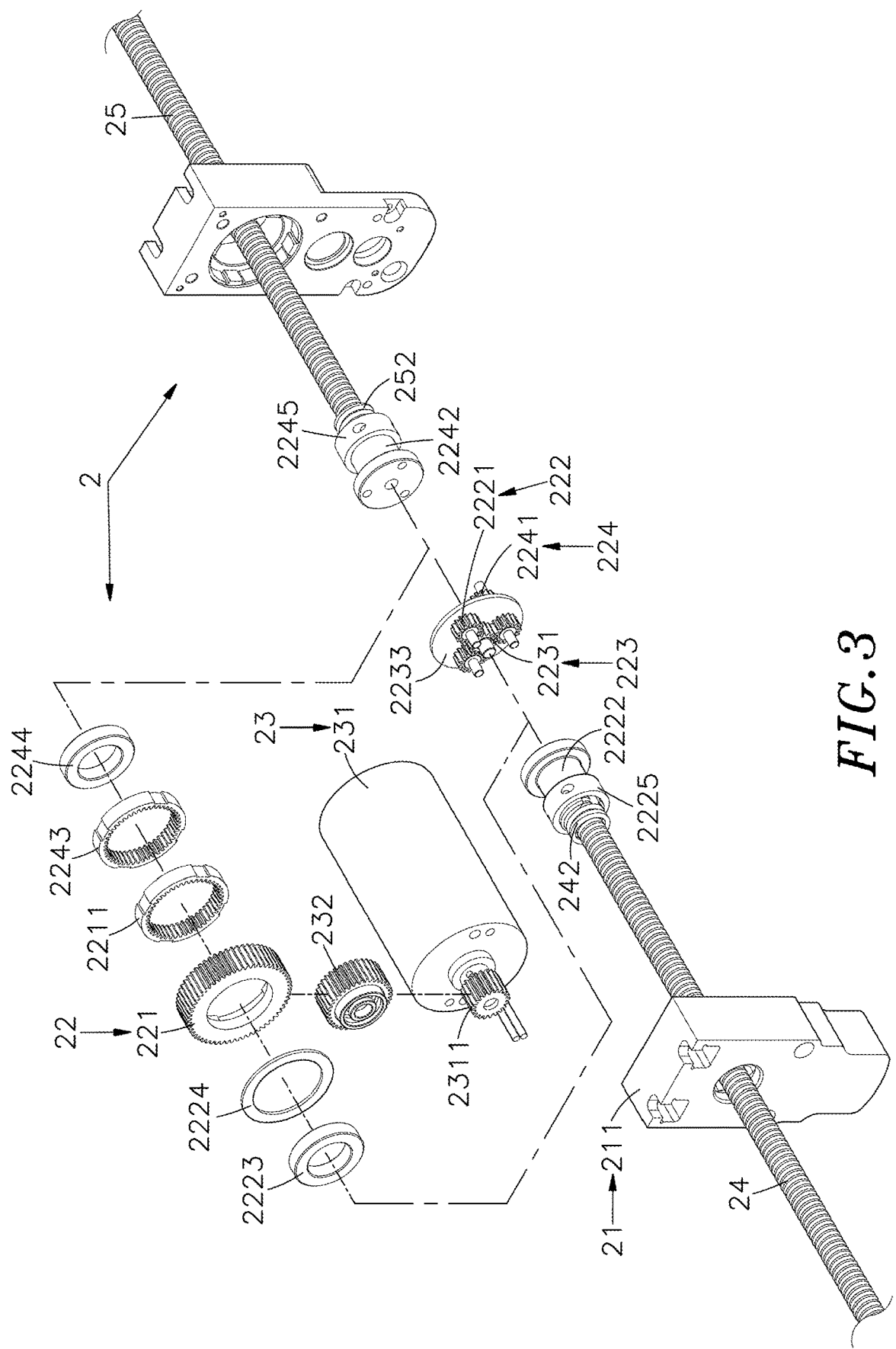
FIG. 3 is an exploded view of the transmission mechanism.
Figure 4:
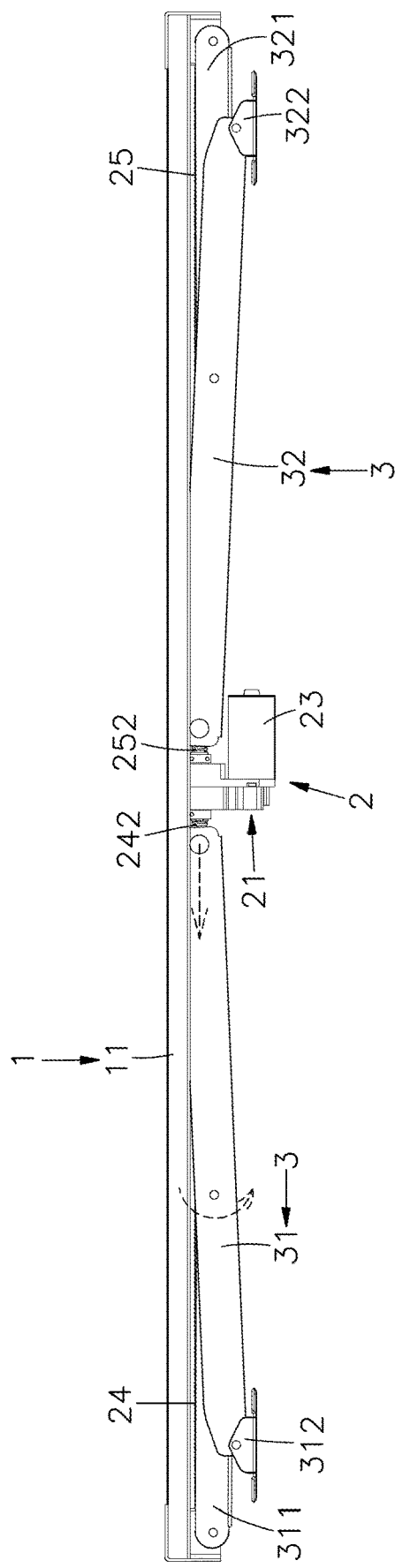
FIG. 4 is a side view of the preferred embodiment of the present invention before extending.

Referring to FIGS. 1-4, an oblique top elevational view of a support device with differential mechanism transmission of a preferred embodiment of the present invention, a sectional side view of the preferred embodiment of the present invention, an exploded view of the transmission mechanism and a side view of the preferred embodiment of the present invention before extending are shown. The support device with differential mechanism transmission comprises a base 1, a transmission device 2 and a support mechanism 3.

The base 1 comprises a beam-type mounting frame 11, two opposite sidewalls 111 provided at two opposite lateral sides of the mounting frame 11 along the width direction, a rail groove 112 with a bottom open side surrounded by the beam-type mounting frame 11 and the two sidewalls 111 and extending along the length direction, and two connecting seats 12 located on the left and right ends of the rail groove 112 respectively.

The transmission device 2 comprises a seat body 21 that is installed in the middle of the beam-type mounting frame 11 and comprising opposing left and right shells 211, a differential mechanism 22 mounted in the two shells 211, a drive unit 23 mounted outside the seat body 21.

The drive unit 23 comprises a motor 231 provided with a drive shaft 2311 (such as a worm or a driving wheel connected to a shaft) that extends into the seat body 21, and a gear set 232 (such as worm gear or driven wheel) drivable by the drive shaft 2311 to rotate the differential mechanism 22. In this embodiment, the differential mechanism 22 comprises a ring gear 221 meshed with the gear set 232, a first internal gear 2211 combined with the inner ring surface of the ring gear 221, a first planetary gear assembly 222 meshed with the first internal gear 2211, a central gear 223, and a second planetary gear assembly 224. The first planetary gear assembly 222 comprises a plurality of, for example, three planetary gears 2221 meshed with the first internal gear 2211, a first output shaft 2222 axially connected to one side of the axis of the three planetary gears 2221, a bearing 2223 mounted on the first output shaft 2222, and a gasket 2224 abutted against the surface of one side of the ring gear 221. The second planetary gear assembly 224 comprises a plurality of, for example, three planetary gears 2241, a second output shaft 2242 axially connected to opposite side of the axis of the three planetary gears 2241 opposite to the first planetary gear assembly 222, a second internal gear 2243 fixedly mounted in the shells 211 of the seat body 21 and meshed around the planetary gears 2241, a bearing 2244 mounted on the second output shaft 2242. The central gear 223 comprises a first toothed portion 2231 located on one side thereof and meshed between the three planetary gears 2221 of the first planetary gear assembly 222, and a second toothed portion 2232 located on an opposite side thereof and meshed between planetary gears 2241 of the second planetary gear assembly 224. Further, the central gear 223 is mounted with a gasket 2233 that is located between the second internal gear 2243 and the first internal gear 2211 and abutted against the surface of an opposite side of the ring gear 221. A first lead screw 24 and a second lead screw 25 have the same thread direction (such as right-hand thread) and are respectively and coaxially connected to one end of the first output shaft 2222 of the first planetary gear assembly 222 and one end of the second output shaft 2242 of the second planetary gear assembly 224 by a respective connector 2225 or 2245. The first lead screw 24 and the second lead screw 25 are respectively screwed with a first actuating member 241 and a second actuating member 251 located in the rail groove 112 of the beam-type mounting frame 11. The other end of the first lead screw 24 and the other end of the second lead screw 25 are respectively pivotally connected to the connecting seats 12. Retaining rings 242,252 are respectively mounted on the one end of the first lead screw 24 near the first output shaft 2222 and the one end of the second lead screw 25 near the second output shaft 2242.

The other ends of the first lead screw 24 and second lead screw 25 can also be provided with rotating members 243, 253 respectively, so that the user can connect a hand crank with the rotating member 243 or 253 to drive the first lead screw 24 or the second lead screw 25 to rotate.

The support mechanism 3 comprises two supporting legs 31,32 respectively pivotally connected to the first actuating member 241 of the first lead screw 24 and the second actuating member 251 of the second lead screw 25, two struts 311,321 each having one end thereof respectively pivotally connected to a middle part of the supporting leg 31 or 32 and an opposite end thereof respectively pivotally connected to one respective connecting seat 12 so that each strut 311 or 321 forms with the associating supporting leg 31 or 32 a y-shaped link, and two foot members 312,322 respectively pivotally connected to the other ends of the supporting legs 31,32 remote from the first actuating member 241 of the first lead screw 24 and the second actuating member 251 of the second lead screw 25.

Figure 5:
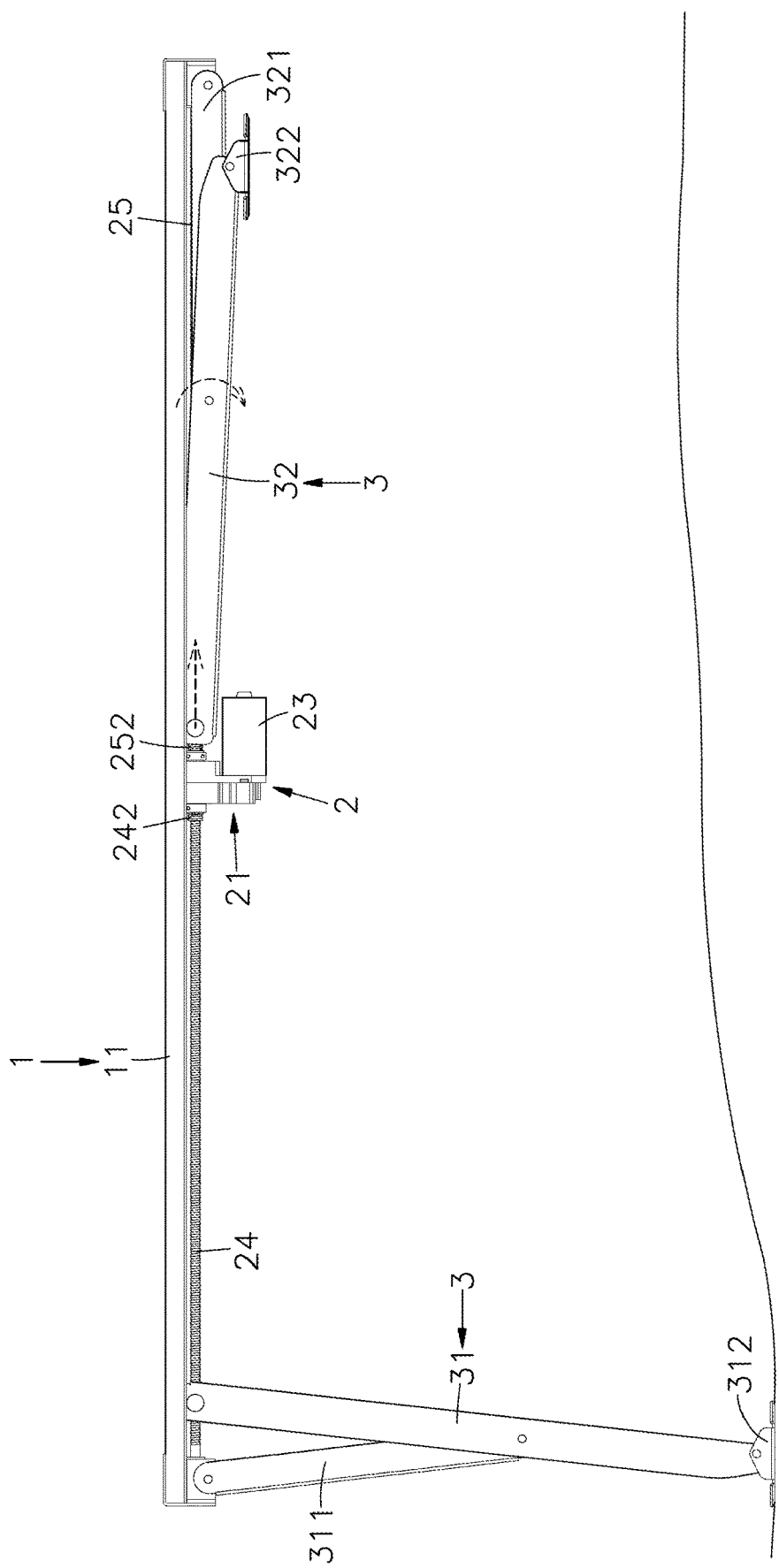
FIG. 5 is a side view of the preferred embodiment of the present invention during extending.
Figure 6:
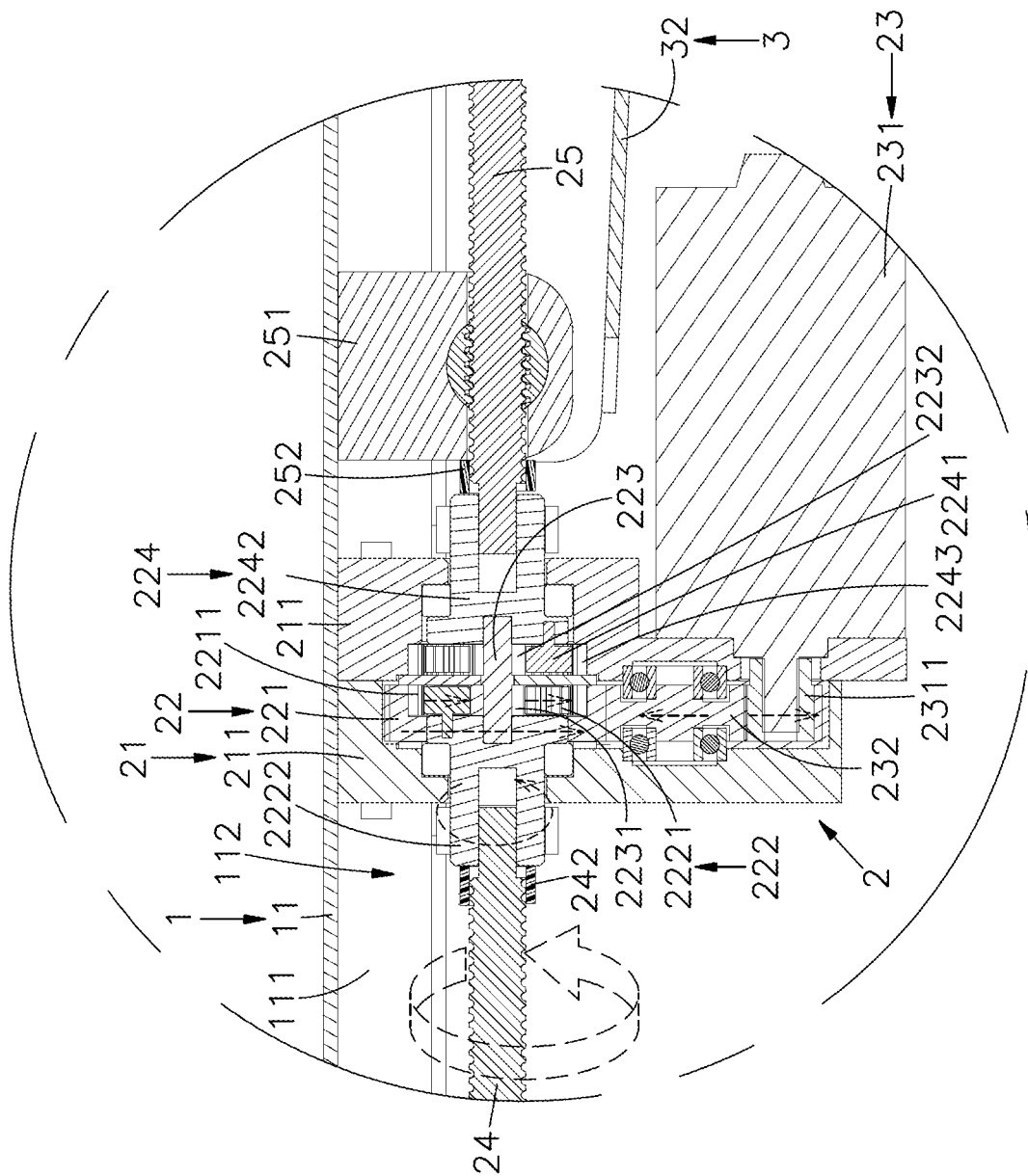
FIG. 6 is a sectional side view of the transmission device, when it is in action (I).
Figure 7:
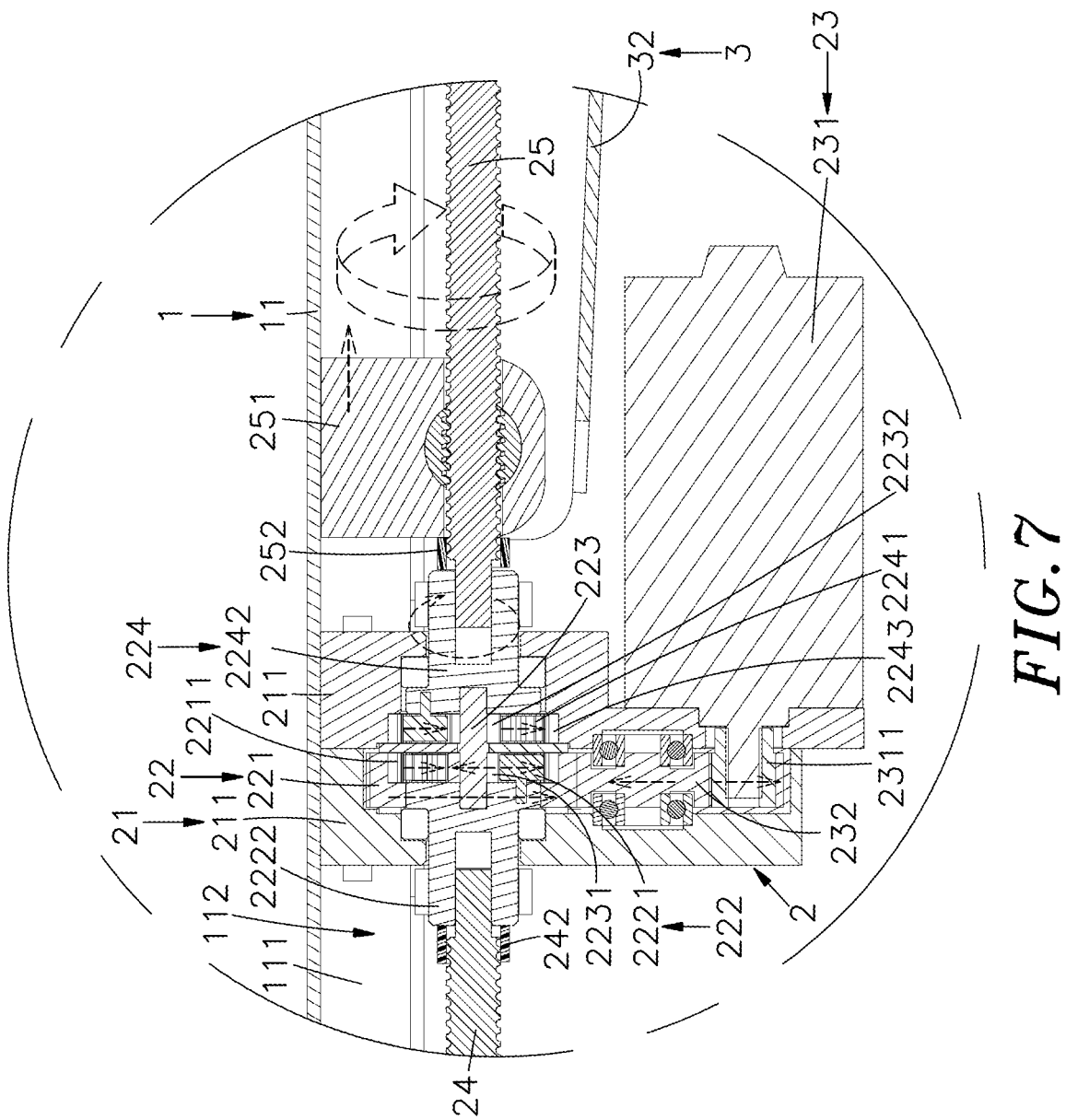
FIG. 7 is a sectional side view of the transmission device, when it is in action (II).
Figure 8:
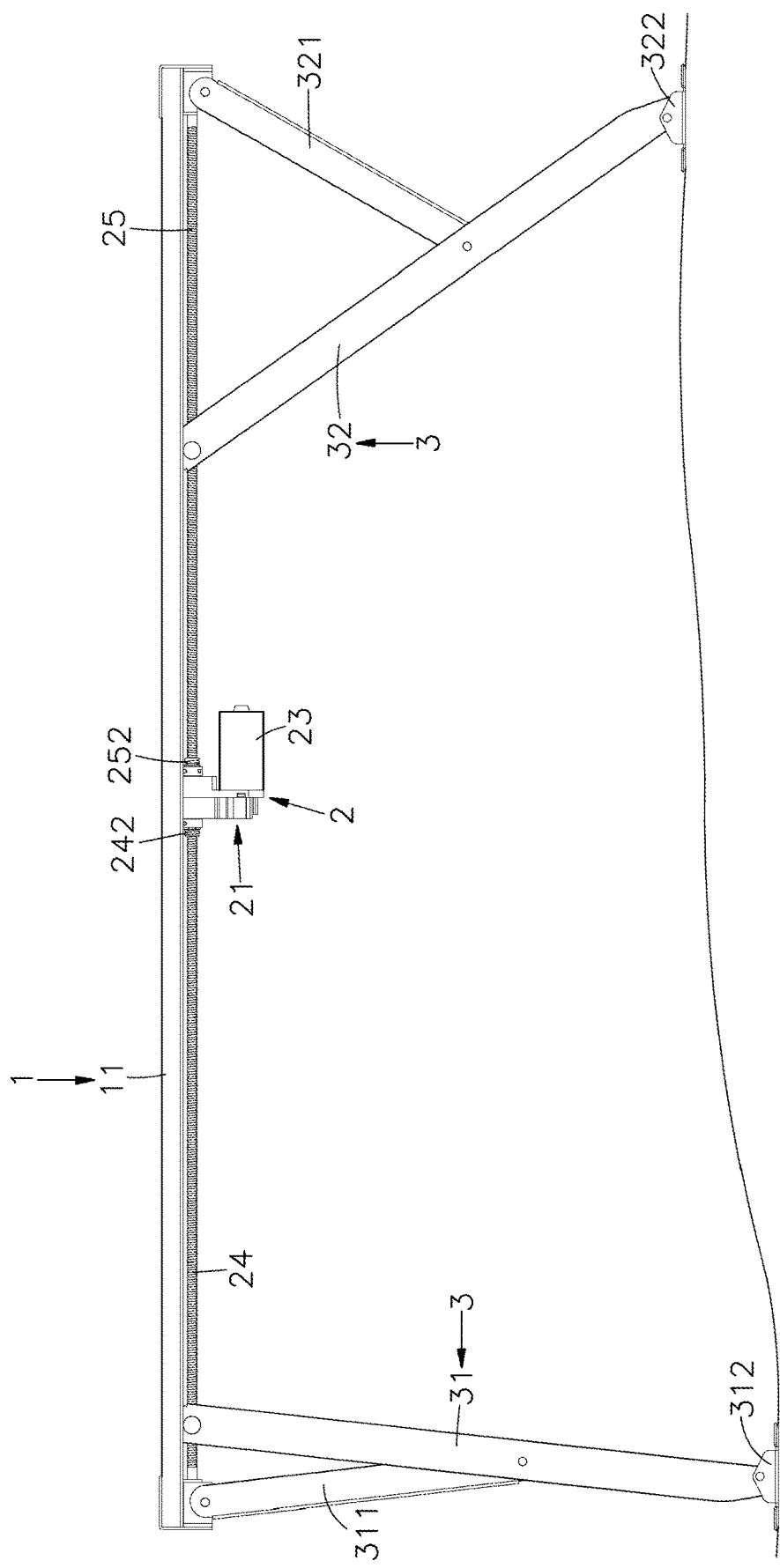
FIG. 8 is a side view of the preferred embodiment of the present invention when it is extended out.

Referring to FIGS. 5-8 that are side view of the preferred embodiment of the present invention during extending, sectional side view of the transmission device, when it is in action (I), sectional side view of the transmission device, when it is in action (II) and side view of the preferred embodiment of the present invention when it is extended out, the support device with differential mechanism transmission is preferably applied to camping vehicles (recreation vehicles), which include, but are not limited to, self-propelled camping vehicles (motorhome), towed/camping trailers (travel trailer; caravan) or load-bearing/camping vans (truck camper; motorcoach). Use the beam-type mounting frame 11 of base 1 to fix it at the bottom of the rear of the vehicle or other appropriate positions. The support device with differential mechanism transmission can also be applied to related devices or equipment that require stable support (such as cranes).

When using the support device to stabilize the vehicle, the drive unit 23 of the transmission device 2 drives the ring gear 221 of the differential mechanism 22 to rotate in the first direction, causing the first internal gear 2211 to drive the multiple planetary gears 2221 of the first planetary gear assembly 222 to rotate in the same direction. Since the thread directions of the first lead screw 24 and the second lead screw 25 are the same, and when the first actuating member 241 and the second actuating member 251 are close to each other at the starting position, if the rotation resistance of the first lead screw 24 is less than the rotation resistance of the second lead screw 25, the axis of the plural planetary gears 2221 of the first planetary gear assembly 222 will drive the first output shaft 2222 to rotate in the same direction, and also the first lead screw 24 so that the first actuating member 241 can move linearly outward along it. Moreover, the second actuating member 251 of the second lead screw 25 can be limited by the retaining ring 252 and cannot be linearly displaced inward, so at the same time, only one lead screw can be continuously driven. At this time, if the second lead screw 25 cannot rotate, it will also make the central gear 223 of the second planetary gear assembly 224 unable to rotate. The plural planetary gears 2221 of the first planetary gear assembly 222 will rotate on its own and follow the central gear 223, and the axis of the plural planetary gears 2221 will drive the first output shaft 2222 to rotate in the same direction to link the first lead screw 24 to push against the first actuating member 241 to drive one of the supporting legs 31 of the support mechanism 3 down. At the same time, it makes the strut 311 use the connecting seat 12 as the axis to expand outward, and after the foot member 312 is supported on the ground, the first lead screw 24 will stop rotating when it receives greater resistance. Since the first lead screw 24 of the transmission device 2 stops rotating, it will also prevent the first output shaft 2222 of the first planetary gear assembly 222 from rotating. When the rotation resistance of the second lead screw 25 is less than the rotation resistance of the first lead screw 24, the plural planetary gears 2221 of the first planetary gear assembly 222 will rotate on its own and drive the central gear 223 in the opposite direction so that the plural planetary gears 2241 of the second planetary gear assembly 224 will rotate along the second internal gear 2243. At the same time, the axis of the plural planetary gears 2241 drives the second output shaft 2242 to rotate in the second direction (that is, the opposite to the first direction of the ring gear 221 rotation), and the second lead screw 25 rotates and pushes against the second actuating member 251 so as to drive the other supporting leg 32 of the support mechanism 3 down. At the same time, it makes the strut 321 use the connecting seat 12 as the axis to expand outward, and after the foot member 322 is supported on the ground, the second lead screw 25 will stop rotating when it receives greater resistance. Until the load current of the motor 231 of the drive unit 23 is greater than the rated current, it will stop running. In addition, when the user needs to retract the support device to move the vehicle, the drive unit 23 can drive the ring gear 221 of the differential mechanism 22 to reverse in the second direction, and drive the multiple planetary gears 2221 of the first planetary gear assembly 222 to rotate. If the resistance of the second lead screw 25 driven by the gear is less than that of the first lead screw 24, the second lead screw 25 can be driven unilaterally. That is to say, the plural planetary gears 2221 of the first planetary gear assembly 222 will rotate on its own and drive in the opposite direction to the central gear 223 so that the plural planetary gears 2241 of the second planetary gear assembly 224 will rotate along the second internal gear 2243 to link the second output shaft 2242 to make the second lead screw 25 turn in the first direction. And the second lead screw 25 rotates and pushes against the second actuating member 251 to drive one of the supporting legs 32 of the support mechanism 3 to ascend. And the strut 321 can be retracted inward with the connecting seat 12 as the axis until the second actuating member 251 resists the retaining ring 252 and receives greater resistance, and the central gear 223 cannot be rotated. The resistance of the first lead screw 24 driven by the gear will be less than that of the first lead screw 24. At this time, the plural planetary gears 2221 of the first planetary gear assembly 222 drive the first output shaft 2222 to rotate in the second direction, and use the first lead screw 24 to rotate and push against the first actuating member 241 to drive the other supporting leg 31 of the support mechanism 3 rise. And it makes the strut 311 take the connecting seat 12 as the axis to retract inward, until the first actuating member 241 resists the retaining ring 242 and the first lead screw 24 receives greater resistance, then the above-mentioned current limiting protection can be used to make the motor 231 stop running when it is subjected to overload current.

Therefore, the present invention mainly provides a support device that can be fixed to the bottom of the vehicle or other appropriate positions using the base 1. When the drive unit 23 of the transmission device 2 drives the ring gear 221 of the differential mechanism 22 to rotate, the first planetary gear assembly 222 can cooperate with the central gear 223 and the second planetary gear assembly 224 to determine the sequence of unilateral transmission of the first lead screw 24 and the second lead screw 25 to drive the supporting legs 31 and 32 of the support mechanism 3 to expand outward or retract inward, and the supporting legs 31, 32 can be adjusted and compensated to support the uneven ground, so as to achieve the purpose of stable support when the vehicle is parked. Because the first lead screw 24 and the second lead screw 25 have the same thread direction, it can avoid the problems of manufacturing difficulties and high costs caused by the double-sided transmission of the positive and negative two-way threads of a single lead screw, and has a simple structure, small size and the effect of cost reduction.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A support device with differential mechanism transmission, comprising:

a base;

a transmission device comprising a seat body installed in a middle of said base, a differential mechanism mounted in said seat body, a drive unit mounted outside said seat body, said differential mechanism comprising a ring gear, a first planetary gear assembly, a central gear and a second planetary gear assembly drivable by said drive unit, a first lead screw and a second lead screw having same thread direction, said first planetary gear assembly and said second planetary gear assembly being coaxially connected with said first lead screw and said second lead screw on both sides, said first lead screw having a first actuating member threaded thereon, said first actuating member being linearly movable along said first lead screw, said second lead screw having a second actuating member threaded thereon, said second actuating member being displace linearly along said second lead screw; and a support mechanism comprising at least two supporting legs respectively pivotally connected to said first actuating member of said first lead screw and said second actuating member of said second lead screw;

wherein when said ring gear of said differential mechanism drives said first planetary gear assembly to rotate, said first planetary gear assembly cooperates with said central gear, and according to the resistance of said second planetary gear assembly to determine the sequence of unilateral transmission of said first lead screw and said second lead screw to drive said supporting legs of said support mechanism to expand outward or retract inward.

2. The support device with differential mechanism transmission as claimed in claim 1, wherein said base comprises a beam-type mounting frame affixed to a bottom of a vehicle, two opposite sidewalls provided at two opposite lateral sides of said beam-type mounting frame along the width direction, a rail groove with a bottom open side surrounded by said beam-type mounting frame and said two opposite sidewalls and extending along the length direction, said rail groove being adapted for said first actuating member of said first lead screw and said second actuating member of said second lead screw to displace linearly therein.

3. The support device with differential mechanism transmission as claimed in claim 2, wherein said beam-type mounting frame of said base further comprises two connecting seats respectively located on left and right ends of said rail groove and respectively pivotally connected with said first lead screw and said second lead screw.

4. The support device with differential mechanism transmission as claimed in claim 3, wherein a support mechanism further comprises two struts, each said strut having one end thereof pivotally connected to a middle part of one respective supporting leg and an opposite end thereof pivotally connected to one respective said connecting seat, so that said two struts respectively use said connecting seats as the axis to expand outward or retract inward.

5. The support device with differential mechanism transmission as claimed in claim 1, wherein said drive unit comprises a motor provided with a drive shaft that extends into said seat body, and a gear set drivable by said drive shaft to rotate said ring gear of said differential mechanism.

6. The support device with differential mechanism transmission as claimed in claim 1, wherein said differential mechanism further comprises a first internal gear combined with an inner ring surface of said ring gear and meshed with a plurality of planetary gears of said first planetary gear assembly, a first output shaft axially connected to one side of the axis of said planetary gears of said first planetary gear assembly and axially connected with said first lead screw, said second planetary gear assembly comprising a plurality of planetary gears, a second output shaft axially connected to an opposite side of the axis of said planetary gears of said second planetary gear assembly opposite to said first planetary gear assembly and axially connected with said second lead screw, and a second internal gear fixedly mounted in said seat body and meshed around said planetary gears of said second planetary gear assembly; said central gear is meshed between said planetary gears of said first planetary gear assembly and said planetary gears of said second planetary gear assembly.

7. The support device with differential mechanism transmission as claimed in claim 6, wherein said differential mechanism further comprises a gasket provided on a central gear between said first internal gear and said second internal gear for lateral contact on a surface of said ring gear.

8. The support device with differential mechanism transmission as claimed in claim 6, wherein a transmission device further comprises two retaining rings respectively mounted on one end of a first lead screw near said first output shaft and one end of a second lead screw near said second output shaft, and two rotating members respectively mounted on an opposite end of said first lead screw and an opposite end of said second lead screw for rotating said first lead screw and said second lead screw respectively.

\* \* \* \* \*